July 25, 1939.  G. E. SLAUGENHOP  2,167,590
AUTOMOBILE SPEED CONTROL
Filed Aug. 20, 1935  2 Sheets-Sheet 2

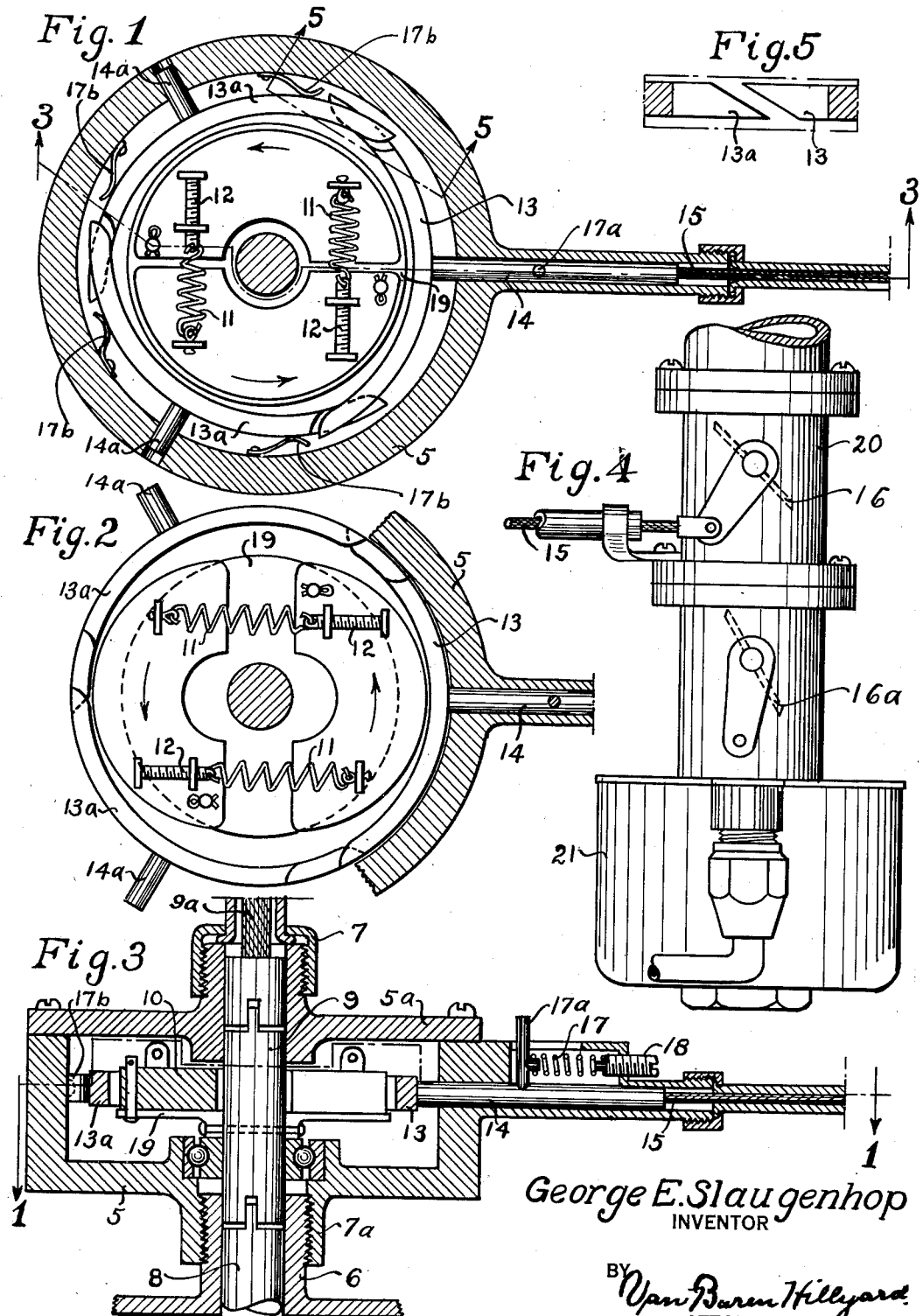

George E. Slaugenhop
INVENTOR.

BY Van Buren Hillyard.
ATTORNEY.

Patented July 25, 1939

2,167,590

UNITED STATES PATENT OFFICE 2,167,590

AUTOMOBILE SPEED CONTROL

George E. Slaugenhop, Vernon, Tex.

Application August 20, 1935, Serial No. 37,096

3 Claims. (Cl. 264—16)

The primary object of this invention is the automatic control of the speed of road vehicles without affecting the speed of the motor until the automobile reaches a predetermined speed.

The invention provides an automotive speed control which can be readily installed without altering or changing the parts of a motor driven vehicle and which will prevent the driver from exceeding the speed for which the mechanism has been set.

While the drawings illustrate a preferred embodiment of the invention, it is to be understood that in adapting the same to meet specific needs and requirements, the design may be varied and changes in the minor details of construction may be resorted to within the scope of the invention as claimed, without departing from the spirit thereof.

For a full understanding of the invention and the merits thereof, reference is to be had to the following description and the drawings hereto attached, in which:

Figure 1 is a sectional detail of an automotive speed control illustrating an embodiment of the invention, the same being taken on the line 1—1 of Figure 3.

Figure 2 is a sectional detail of a portion of the governor, showing the position of the parts when the control elements are thrown outward.

Figure 3 is a sectional view of the parts shown in Figure 1, taken on the line 3—3.

Figure 4 is a detail view of a conventional carburetor and manifold coupled thereto showing the governor connecting means attached to the throttle valve.

Figure 5 is a sectional detail on the line 5—5 of Figure 1.

Figure 6:
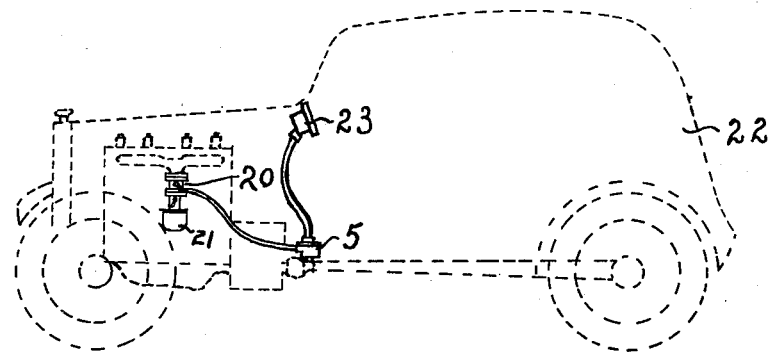

Figure 6 indicates by dotted lines a conventional automobile with the speed control for the engine throttle installed.

Figure 7:
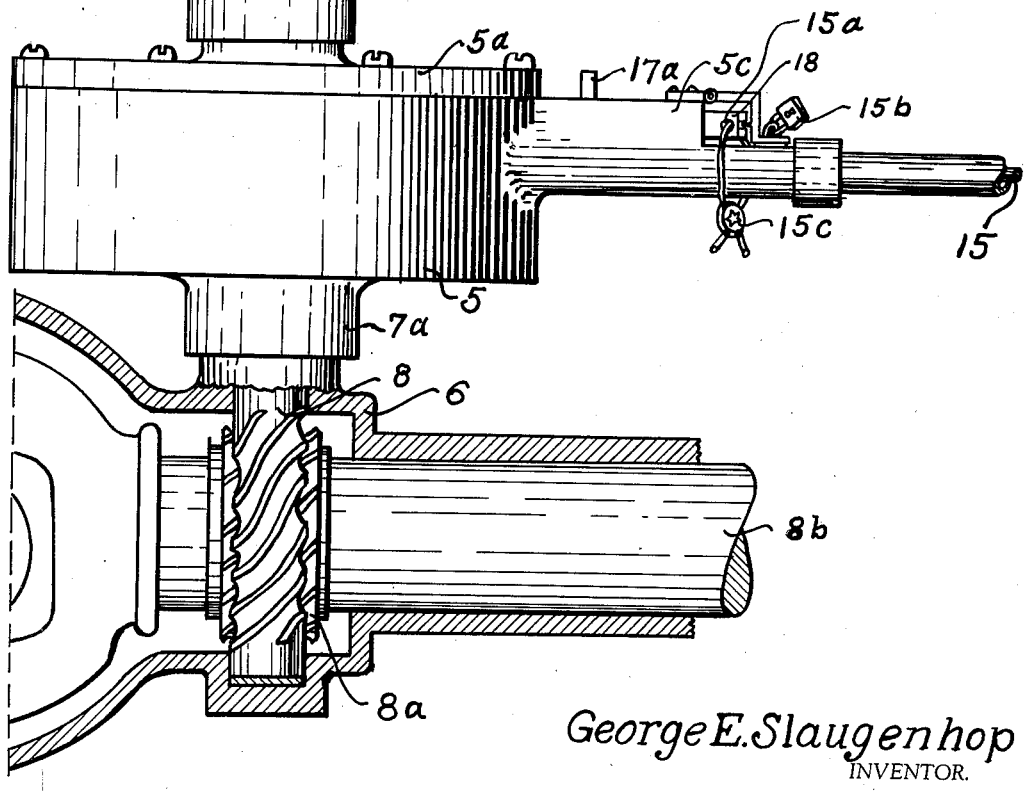

Figure 7 is an enlarged detail view of a portion of the drive shaft, the governor mechanism and the connection between the drive and speedometer shafts.

Corresponding and like parts are referred to in the following description and designated in the several views of the drawings by like reference characters.

The numeral 6 designates the universal joint housing of an automobile and 7 the coupling of the speedometer shaft usually connected thereto. In the present instance, a housing 5 is coupled to the housing 6 and the coupling 7 is connected to the cover 5a of the housing 5. The speedometer cable 9a is connected by a coupling 9 to the speedometer drive shaft 8. A plate 19 is mounted upon the part 9 and rotates therewith. Similar weights 10 are pivoted at opposite ends to the plate 19. Contractile helical springs 11 connected the free ends of the weights 10 with the respective pivotal ends. Set screws 12 mounted upon the pivotal ends of the weights have one end of the springs 11 connected thereto. In this manner, the tension of the springs 11 may be adjusted to counteract centrifugal action. A sectional ring, including three sections 13, 13a, encircles the elements 10 and their ends are beveled and overlapped, as shown most clearly in Figure 5. Guide pins 14a project radially from the sections 13a and enter openings in the rim of the housing 5. Springs 17b normally urge the sections 13a inwardly, two being provided for each section and disposed equi-distantly from the respective guide pins. A bar 14 is connected to the section 13 and has a pin 17a projecting transversely therefrom and operating in a slot 17c in a side of an extension 5c of the housing 5. A cable 15, or analogous part, is connected to the bar 14 and moves therewith. An expansible helical spring 17 housed in the extension 5c exerts a pressure to urge the bar 14 inward and has its tension regulatable by means of a set screw 18. This set screw may be secured in a located position by means of a hasp lock 15b, or other means engaging.

The housing 6, carburetor 21, intake manifold connection 20 and speedometer connection 9a are well known parts of a motor vehicle. To install the invention, the part 9a is disconnected from the housing 6 and the housing 5 is coupled to the latter. The governor connection 15 is attached to the throttle or control valve 16. The weights 10, or control elements, normally clear the sections 13—13a of the expansible governor ring. The speedometer drive shaft is connected by gearing 8a, or in any preferred way, with the drive shaft 8b. When the vehicle attains a predetermined speed, the weights 10 fly outward and engage the sections 13—13a and, as the speed increases, the governor ring expands and operates the valve 16 to throttle the engine and prevent excessive speed. Thus, it will be understood that the engine is controlled only to prevent the vehicle exceeding a given speed. The governor is actuated by the vehicle drive and not by the engine, hence the engine may be raced when the vehicle is standing without affecting the governor. The drawings show the preferred installation of the speed control but it is obvious that the mechanism may be installed in any desired manner found most advantageous so long as it is actuated by the drive of the vehicle to control the engine to prevent excessive vehicular speed. After the tension of the several springs 11 and 17 has been adjusted to insure proper action of the governor, the position of the set screw 18 is fixed in the manner stated to prevent tampering therewith.

Having thus described the invention, what I claim is:

1. Speed control means for an engine throttle comprising a housing having a longitudinally slotted extension, a drive member in the housing, governor weights carried by the drive member, a sectional ring comprising three sections encircling the governor weights, guide means between two sections of the ring and the housing, a bar connected to the other or middle section of the ring and mounted in the extension of the housing and having a transverse projection operable in the slot of said extension, a set screw, a spring between the set screw and said transverse projection, locking means for securing the set screw in adjusted position, and connecting means between said bar and engine throttle.

2. In a speed control device, a housing having a shaft journaled therein, centrifugal weights carried by the shaft, a sectional ring including at least three sections enclosing the centrifugal weights, guide means between two sections of the ring and the housing, and an operating bar connected with a third section of the ring and extending laterally through the housing.

3. In a speed control device, a housing having a shaft journaled therein, centrifugal weights carried by the shaft, a segmental ring surrounding the centrifugal weights and axial shaft, and an operating bar connected with a segment of the ring and extending laterally through the housing for movement in response to the centrifugal action of the weights.

GEORGE E. SLAUGENHOP.